US012675690B2

(12) United States Patent
Dutta et al.

(10) Patent No.: US 12,675,690 B2
(45) Date of Patent: Jul. 7, 2026

(54) ANOMALY DETECTION WITH MODEL HYPERPARAMETER SELECTION

(71) Applicant: NUTANIX, INC., San Jose, CA (US)

(72) Inventors: Debojyoti Dutta, Santa Clara, CA (US); Rajat Ghosh, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 923 days.

(21) Appl. No.: 17/706,000

(22) Filed: Mar. 28, 2022

(65) Prior Publication Data

US 2023/0186075 A1     Jun. 15, 2023

Related U.S. Application Data

(60) Provisional application No. 63/287,639, filed on Dec. 9, 2021.

(51) Int. Cl.
| | |
|---|---|
| *G06N 3/08* | (2023.01) |
| *G06F 18/21* | (2023.01) |
| *G06F 18/211* | (2023.01) |
| *G06N 3/045* | (2023.01) |

(52) U.S. Cl.
CPC ............. *G06N 3/08* (2013.01); *G06F 18/211* (2023.01); *G06F 18/217* (2023.01); *G06N 3/045* (2023.01)

(58) Field of Classification Search
CPC ........... G06N 3/08; G06N 3/02; G06N 3/045; G06N 3/04; G06N 3/092; G06N 3/0985; G06N 3/0442; G06N 3/044; G06F 18/211; G06F 18/217; G06F 18/21
USPC .............................................. 706/15, 16, 25
See application file for complete search history.

(56) References Cited

U.S. PATENT DOCUMENTS

| | | | |
|---|---|---|---|
| 8,549,518 B1 | 10/2013 | Aron et al. | |
| 8,554,703 B1 | 10/2013 | Lin et al. | |
| 8,601,473 B1 | 12/2013 | Aron et al. | |
| 8,850,130 B1 | 9/2014 | Aron et al. | |
| 8,863,124 B1 | 10/2014 | Aron | |
| 9,009,106 B1 | 4/2015 | Aron et al. | |
| 9,069,708 B2 | 6/2015 | Gill et al. | |
| 9,336,132 B1 | 5/2016 | Aron et al. | |
| 9,652,265 B1 | 5/2017 | Narayanasamy et al. | |
| 9,747,287 B1 | 8/2017 | Bhardwaj et al. | |
| 9,772,866 B1 | 9/2017 | Aron et al. | |
| 10,509,847 B1 * | 12/2019 | Xu | G06F 17/18 |
| 10,616,257 B1 * | 4/2020 | Soulhi | H04L 63/1425 |
| 12,033,048 B1 * | 7/2024 | Callot | G06F 18/214 |
| 2016/0042287 A1 * | 2/2016 | Eldardiry | G06Q 50/22 706/14 |

(Continued)

OTHER PUBLICATIONS

Khosravi et al., "Construction of Optimal Prediction Intervals for Load Forecasting Problems", IEEE Transactions On Power Systems, vol. 25, No. 3, Aug. 2010, pp. 1496-1503. (Year: 2010).*

(Continued)

*Primary Examiner* — Hwei-Min Lu

(74) *Attorney, Agent, or Firm* — Artegis Law Group, LLP

(57) ABSTRACT

Anomaly detection includes receiving, for one or more data points of a data set, an anomaly label indicating whether the one or more data points is an anomaly; generating, using a first machine learning model, one or more hyperparameters based on the one or more data points and the anomaly label; and training a second machine learning model to determine anomalies in the data set, wherein the training is based on the one or more hyperparameters.

36 Claims, 7 Drawing Sheets

(56) References Cited

U.S. PATENT DOCUMENTS

| | | | | |
|---|---|---|---|---|
| 2018/0293488 | A1* | 10/2018 | Dang | G06N 3/088 |
| 2018/0357540 | A1* | 12/2018 | Hwang | G06N 3/08 |
| 2019/0130285 | A1* | 5/2019 | Snyder | G06N 5/022 |
| 2019/0370684 | A1 | 12/2019 | Gunes et al. | |
| 2020/0034665 | A1 | 1/2020 | Ghanta et al. | |
| 2020/0334228 | A1* | 10/2020 | Matyska | G06Q 30/0185 |
| 2020/0364561 | A1 | 11/2020 | Ananthanarayanan et al. | |
| 2020/0387797 | A1* | 12/2020 | Ryan | G06F 11/3409 |
| 2021/0064989 | A1* | 3/2021 | Shaker | G06N 3/092 |
| 2021/0065053 | A1 | 3/2021 | Higgins et al. | |
| 2021/0073995 | A1* | 3/2021 | Yang | G06N 3/0464 |
| 2021/0110211 | A1 | 4/2021 | Grindstaff et al. | |
| 2021/0136098 | A1* | 5/2021 | Stergioudis | G06N 20/10 |
| 2021/0201209 | A1* | 7/2021 | Sghiouer | G06N 5/04 |
| 2021/0287089 | A1* | 9/2021 | Mayer | G06N 3/04 |
| 2021/0365774 | A1* | 11/2021 | Muhammad | G06N 3/044 |
| 2022/0269577 | A1* | 8/2022 | Gechman | G06F 11/3006 |
| 2023/0029794 | A1* | 2/2023 | Huang | H04L 63/1425 |
| 2023/0059708 | A1* | 2/2023 | Metz | G06N 3/096 |
| 2023/0267713 | A1* | 8/2023 | Ishizaka | G06V 10/776 |

OTHER PUBLICATIONS

Xu et al., "Automatic Hyperparameter Tuning Method for Local Outlier Factor, with Applications to Anomaly Detection", 2019 IEEE International Conference on Big Data (Big Data), Dec. 2019, pp. 4201-4207. (Year: 2019).*

Yang et al., "On Hyperparameter Optimization of Machine Learning Algorithms: Theory and Practice", ARXIV ID: 2007.15745, Jul. 30, 2020, pp. 1-69. (Year: 2020).*

Iranfar et al., "Multiagent Reinforcement Learning for Hyperparameter Optimization of Convolutional Neural Networks", IEEE Transactions On Computer-Aided Design of Integrated Circuits and Systems, vol. 41, No. 4, Date of Publication May 3, 2021, pp. 1034-1047. (Year: 2021).*

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Wikipedia, "State-action-reward-state-action", https/en.wikipedia.org/wiki/State-actions-reward-state-action, 3 pages.

Yen, Steven "Intelligent Log Analysis for Anomaly Detection", https://scholarworks.sjsu.edu/cgi/viewcontent.cgi?article=1740&context=etd_projects, 49 pages.

Keda, et al., "Human-Assisted Online Anomaly Detection with Normal Outlier Retraining", https://www.andrew.cmu.edu/user/lakoglu/odd/accepted_papers/ODD_v50_paper_11.pdf, 9 pages.

Poitras, Steven. "The Nutanix Bible" (Sep. 1, 2020), from https://nutanixbible.com/, Part 1, 270 pages.

Poitras, Steven. "The Nutanix Bible" (Sep. 1, 2020), from https://nutanixbible.com/, Part 2, 31 pages.

* cited by examiner

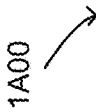

1A00

Communications Link 815

NFS Requests 802 iSCSI Requests 803

SMB Requests 804

Controller Virtual Machine Instance 830

IOCTL Handler Functions 808

CVM IP Address 810

0.0.0.0

Virtual Disk Configuration Manager 812

Data I/O Manager Functions 814

NFS I/O iSCSI I/O

SMB I/O

Content Cache Manager Facility 816

Local Memory Device Access Block 818

Local SSD Device Access Block 820

Metadata Manager Functions 822

Local Metadata Storage Access Block 824

CVM Virtual Disk Controller 826

API I/O Manager 845

UI I/O Handler 840

Configuration 851

Computing Platform 806

Communications Link 815

Hypervisor

CPU1 CPU2 — CPUN

Data Repository 831

Virtual Machine Instance

Network Interface Port 823₁

Network Protocol Packet 821₁

Network Interface Port 823₂

Network Protocol Packet 821₂

Internet 848

Server 201

Memory 204

First Machine Learning Model 212 → Hyperparameter(s) 214

Machine Learning Trainer 216

Anomaly Detection Engine 218

Second Machine Learning Model 220

Processor 202

Data Set 206

User-Selected Anomaly Label 210-1

Data Point(s) 208-1

Data Point(s) 208-2

Predicted Anomaly Label 210-2

400

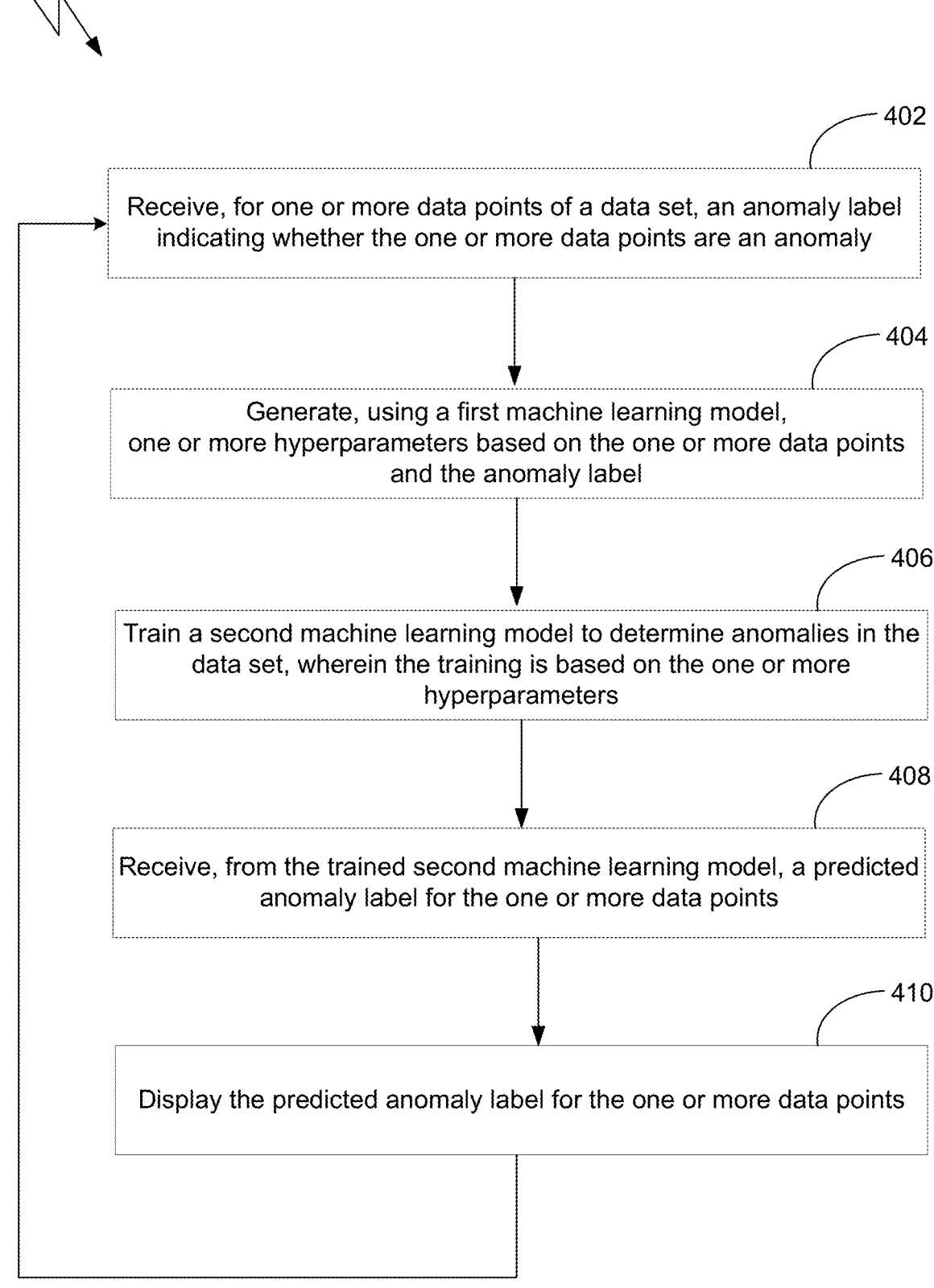

402

Receive, for one or more data points of a data set, an anomaly label indicating whether the one or more data points are an anomaly

404

Generate, using a first machine learning model, one or more hyperparameters based on the one or more data points and the anomaly label

406

Train a second machine learning model to determine anomalies in the data set, wherein the training is based on the one or more hyperparameters

408

Receive, from the trained second machine learning model, a predicted anomaly label for the one or more data points

410

Display the predicted anomaly label for the one or more data points

FIG. 4

ANOMALY DETECTION WITH MODEL HYPERPARAMETER SELECTION

CROSS-REFERENCE TO RELATED APPLICATION

This application claims benefit of the United States Provisional patent application titled "ANOMALY DETECTION WITH MODEL HYPERPARAMETER SELECTION," filed Dec. 9, 2021, and having Ser. No. 63/287,639. The subject matter of this related application is hereby incorporated herein by reference.

BACKGROUND

Field of the Various Embodiments

The various embodiments relate generally to computing devices and, more specifically, to anomaly detection with model hyperparameter selection.

Description of the Related Art

Anomaly detection typically involves an analysis of a data set in order to determine whether or not various portions of the data set indicate or do not indicate anomalies. The data set can be metrics recorded by a server or generated from data or metadata of the server, or events recorded in an event log. As a first such example, in an information system, such as a file server, time-series metrics such as processor load, read/write latency, and network traffic can indicate periods of ordinary or typical server behavior and other periods that indicate anomalies, such as malware or hardware failures. As a second such example, in a network device, such as a router or webserver, time-series metrics such as traffic volume, traffic distribution, and response latency can include some periods that indicate period of ordinary or typical network service and other periods that indicate anomalies, such as increased metrics that indicate a denial-of-service (DoS) attack.

Machine learning models can be configured to process the data set and to generate predictions of whether portions of the data set indicate an anomaly. For example, a machine learning model can process time series data of a set of metrics in order to classify one or more windows of data samples of the time series data as anomalies. Specifically, for each window of data samples, a machine learning classifier can classify the data samples and output either a first anomaly label indicating that the data samples are an anomaly or a second anomaly label indicating that the data samples are not an anomaly.

In such scenarios, the machine learning model can be trained or retrained to determine whether each window of data samples of the data set is an anomaly. The training involves a training data set, such as time series data in which some subsets of data samples are identified as anomalies. The machine learning model is trained to predict anomaly labels that are associated with the respective windows of the training data set that matches a ground-truth anomaly label. The training can be determined a success if the classification accuracies of the trained machine learning model on the training data set are within accuracy thresholds of a confusion matrix, such as a table indicating an accuracy threshold for true positives (e.g., a minimum frequency with which the machine learning model correctly identifies an anomaly), an accuracy threshold for false positives (e.g., a maximum frequency with which the machine learning model incorrectly identifies an anomaly where an anomaly does not occur), an accuracy threshold for true negatives (e.g., a minimum frequency with which the machine learning model incorrectly fails to identify an anomaly where there is an anomaly), and an accuracy threshold for false negatives (e.g., a maximum frequency with which the machine learning model correctly identifies an anomaly).

In some cases, the application of the machine learning model to a data set can result in false positives, wherein certain data samples are incorrectly determined to be an anomaly. For example, unusual access patterns of a storage volume can result in performance metrics that the machine learning model classifies as a hardware failure, even if no such failure exists. Additionally, the application of the machine learning model to the data set can result in false negatives, wherein certain data samples are incorrectly determined not to be an anomaly. For example, transfer rate metrics of a storage device can be reduced compared to earlier transfer rates of the storage device, indicating an imminent failure of the storage device. However, if the transfer rate metrics are within a typical range of transfer rates for the storage devices, the machine learning model could fail to determine that the metrics indicate an anomaly until the storage device has failed. In some cases, false positives and false negatives occur due to new or newly identified types of anomalies that the machine learning model has not previously been trained to identify. In some other cases, false positives and false negatives can occur due to drift, in which changes within the data set and/or continued development of the machine learning model result in changes in anomaly prediction, where data points that were initially classified correctly are later classified incorrectly.

When false positives and/or false negatives occur, a user, such as a developer, can retrain the machine learning model to determine the new anomalies. As a first example, the user can analyze the data set in order to generate rules by which the data samples are determined to be anomalies or not anomalies. The user can provide the rules to the machine learning model for retraining. As a second example, the user can select new hyperparameters for the machine learning model, such as an increased or decreased window size or a threshold value by which data points are determined to be an anomaly. Based on the user-developed rules or the user-selected hyperparameters, the trained or retrained second machine learning model can be deployed to one or more devices (e.g., servers or routers) to update the anomaly detection capabilities of the devices based on the provided training data set.

One drawback of such techniques is the degree of participation of the user in the adaptation of the machine learning model. As a first example, the development of rules that accurately classify the data points that are anomalous and the data point that are not anomalous, in addition to any data points by which the machine learning model was previously trained, can be a difficult and time-consuming process. As a second example, due to the complexity of the data and the machine learning model, user-selected changes to model hyperparameters can involve an experimental, trial-and-error selection process, in which some selections result in improved classification accuracy and others result in unchanged or reduced classification accuracy. However, the development of rules and/or experimental selection of hyperparameters can involve a considerable amount of time, such as days or weeks. As a result, the adaptation of the machine learning model based on new data samples and/or new anomalies can be delayed by an extended duration. During the delay, anomaly detection may continue to exhibit false positives and false negatives, even though the limitations of the machine learning model are known to developers.

As the foregoing indicates, what is needed are more effective techniques for anomaly detection with model hyperparameter selection.

SUMMARY

One embodiment sets forth one or more non-transitory computer-readable media storing program instructions that, when executed by one or more processors, cause the one or more processors to perform a method. The method includes receiving, for at least one or more data points of a data set, an anomaly label indicating whether the at least one or more data points is are an anomaly. The method further includes generating, using a first machine learning model, at least one or more hyperparameters based on the at least one or more data points and the anomaly label. The method also includes training a second machine learning model to determine anomalies in the data set, wherein the training is performed using the at least one or more hyperparameters.

Further embodiments provide, among other things, a method and a system for implementing the method described above.

One embodiment sets forth a system including a memory that stores instructions, and a processor that is coupled to the memory and, when executing the instructions, is configured to train a first machine learning model to generate one or more hyperparameters, the training being based on a reinforcement learning process and a cost function including a difference between one or more current hyperparameters for a second machine learning model and one or more updated hyperparameters for the second machine learning model; receive, from a set of servers, one or more performance metrics, wherein each performance metric indicates a performance of at least one server of the set of servers, and one or more logs, wherein each log indicates one or more events arising within at least one server of the set of servers; generate, from the one or more performance metrics and the one or more logs, a time series data set of data points; display, for a user, a user interface including a time series plot of the time series data set; receive, from the user, a selection of a portion of the time series plot and a designation of the portion of the time series plot as either an anomaly or not an anomaly; identify one or more data points of the time series data set that are included in the selected portion of the time series plot; determine, based on the designation, an anomaly label for the one or more data points; generate, using the first machine learning model, one or more updated hyperparameters based on the identified one or more data points and the anomaly label; train the second machine learning model based on the one or more updated hyperparameters to determine anomalies in the data set; receive, from the set of servers, one or more additional performance metrics and one or more additional logs; determine, by the trained second machine learning model, whether the one or more additional performance metrics and the one or more additional logs indicate an anomaly, and perform an action in response determining that the one or more additional performance metrics and the one or more additional logs indicate an anomaly, the action including one or more of, starting at least one process on at least one server of the set of servers, stopping at least one process on at least one server of the set of servers, or migrating at least one resource from one server of the set of servers to a different server of the set of servers.

At least one technical advantage of the disclosed techniques relative to the prior art is that, with the disclosed techniques, the second machine learning model is rapidly trained or retrained to detect anomalies including a correct anomaly label for the one or more data points. For example, while manual selection or adjustment of the hyperparameters and/or rules-based approaches can take weeks or months to update the second machine learning model, generating the hyperparameters by the first machine learning model can enable the second machine learning model to be updated in less than a day. As a result, updating the second machine learning model as disclosed herein can quickly adapt the anomaly detection to new patterns in the data set in order to detect newly identified anomalies and/or to reduce recent incorrect determinations of anomalies. Further, anomaly detection can be quickly achieved by the disclosed techniques with reduced user involvement, which can enable adjustment of the anomaly detection system faster, easier, and without requiring a familiarity with machine learning models or training. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIGS. 1A-1D are block diagrams illustrating virtualization system architectures configured to implement one or more aspects of the present embodiments;

FIG. 4 illustrates a flow diagram of method steps for configuring the virtualization system architectures of FIGS. 1A-1D or the computer system 200 of FIG. 2 to detect anomalies, according to various embodiments.

DETAILED DESCRIPTION

Figure 1B:
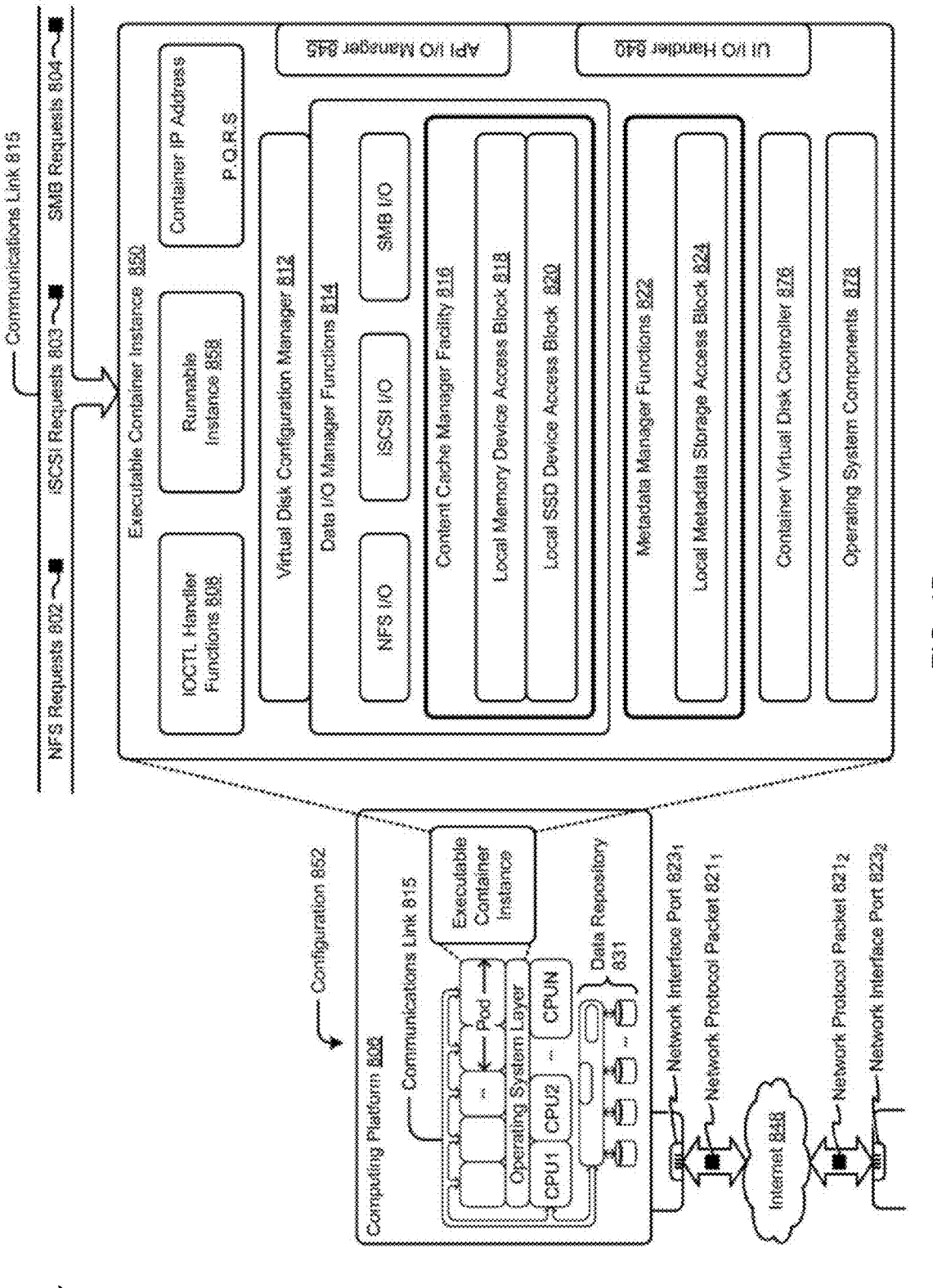

In the following description, numerous specific details are set forth to provide a more thorough understanding of the various embodiments. However, it will be apparent to one of skilled in the art that the inventive concepts may be practiced without one or more of these specific details.

Exemplary Virtualization System Architectures

FIG. 1A is a block diagram illustrating virtualization system architecture 1A00 configured to implement one or more aspects of the present embodiments. As shown in FIG. 1A, virtualization system architecture 1A00 includes a collection of interconnected components, including a controller virtual machine (CVM) instance 830 in a configuration 851. Configuration 851 includes a computing platform 806 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 830.

In this and other configurations, a CVM instance receives block I/O storage requests as network file system (NFS) requests in the form of NFS requests 802, internet small computer storage interface (iSCSI) block IO requests in the form of iSCSI requests 803, Samba file system (SMB) requests in the form of SMB requests 804, and/or the like. The CVM instance publishes and responds to an internet protocol (IP) address (e.g., CVM IP address 810). Various forms of input and output can be handled by one or more IO control handler functions (e.g., IOCTL handler functions 808) that interface to other functions such as data 10 manager functions 814 and/or metadata manager functions 822. As shown, the data 10 manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 806 includes one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random-access persistent memories (RAPMs) or optical or magnetic media drives such as paper tape or magnetic tape drives. Volatile media includes dynamic memory such as random-access memory (RAM). As shown, controller virtual machine instance 830 includes content cache manager facility 816 that accesses storage locations, possibly including local dynamic random-access memory (DRAM) (e.g., through local memory device access block 818) and/or possibly including accesses to local solid-state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., $CPU_1$, $CPU_2$, ..., $CPU_N$). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one example configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRON- MENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

FIG. 1B depicts a block diagram illustrating another virtualization system architecture 1B00 configured to implement one or more aspects of the present embodiments. As shown in FIG. 1B, virtualization system architecture 1B00 includes a collection of interconnected components, including an executable container instance 850 in a configuration 852. Configuration 852 includes a computing platform 806 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data 10 management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 1C:
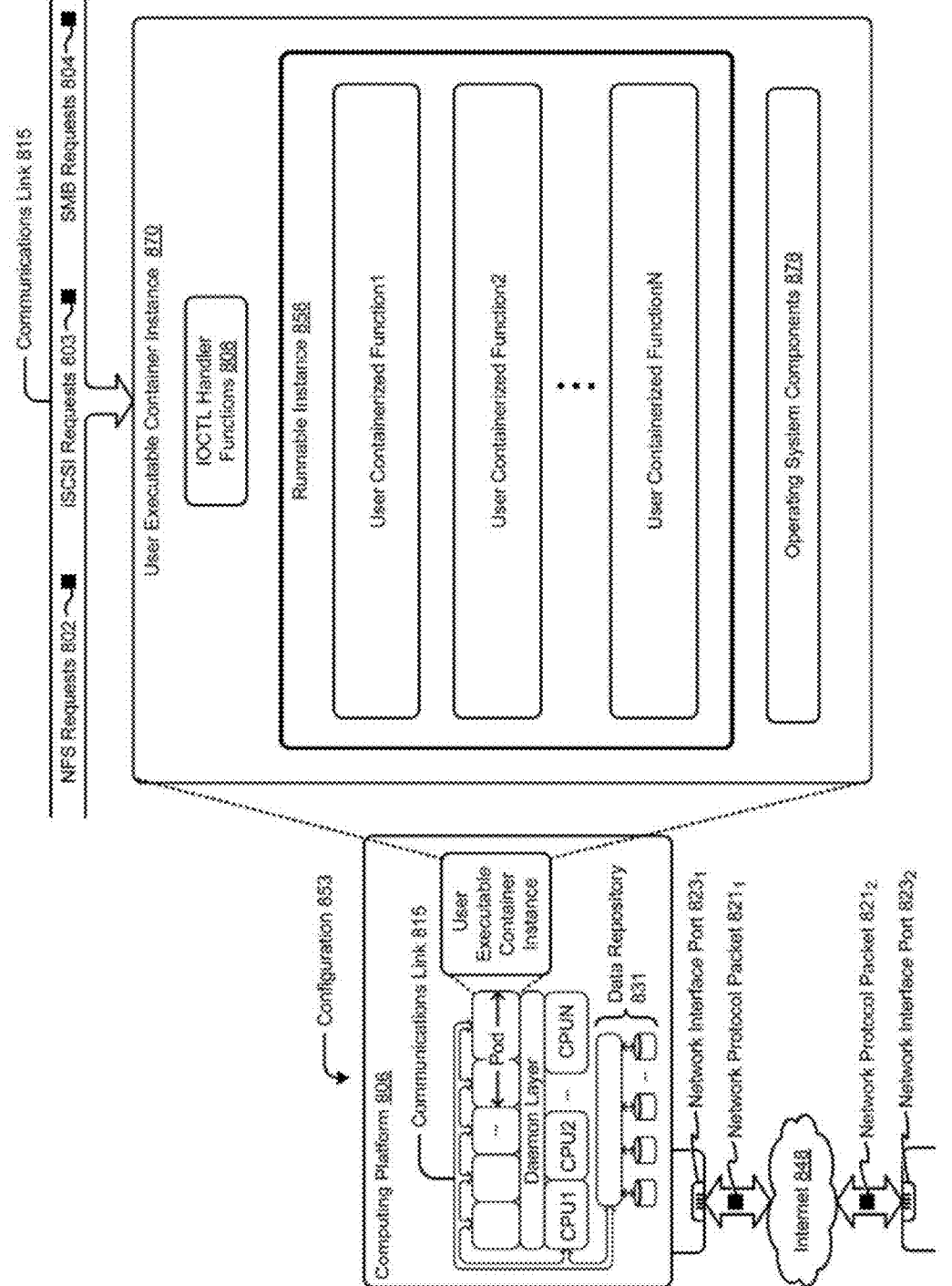

FIG. 1C is a block diagram illustrating virtualization system architecture 1C00 configured to implement one or more aspects of the present embodiments. As shown in FIG. 1C, virtualization system architecture 1C00 includes a collection of interconnected components, including a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized functions, user containerized function$_2$, . . . , user containerized function$_N$). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In some embodiments of a daemon-assisted containerized architecture, computing platform 806 might or might not host operating system components other than operating system components 878. More specifically, the shown daemon might or might not host operating system components other than operating system components 878 of user executable container instance 870.

In some embodiments, the virtualization system architecture 1A00, 1B00, and/or 1C00 can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some embodiments, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 851) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 1D:
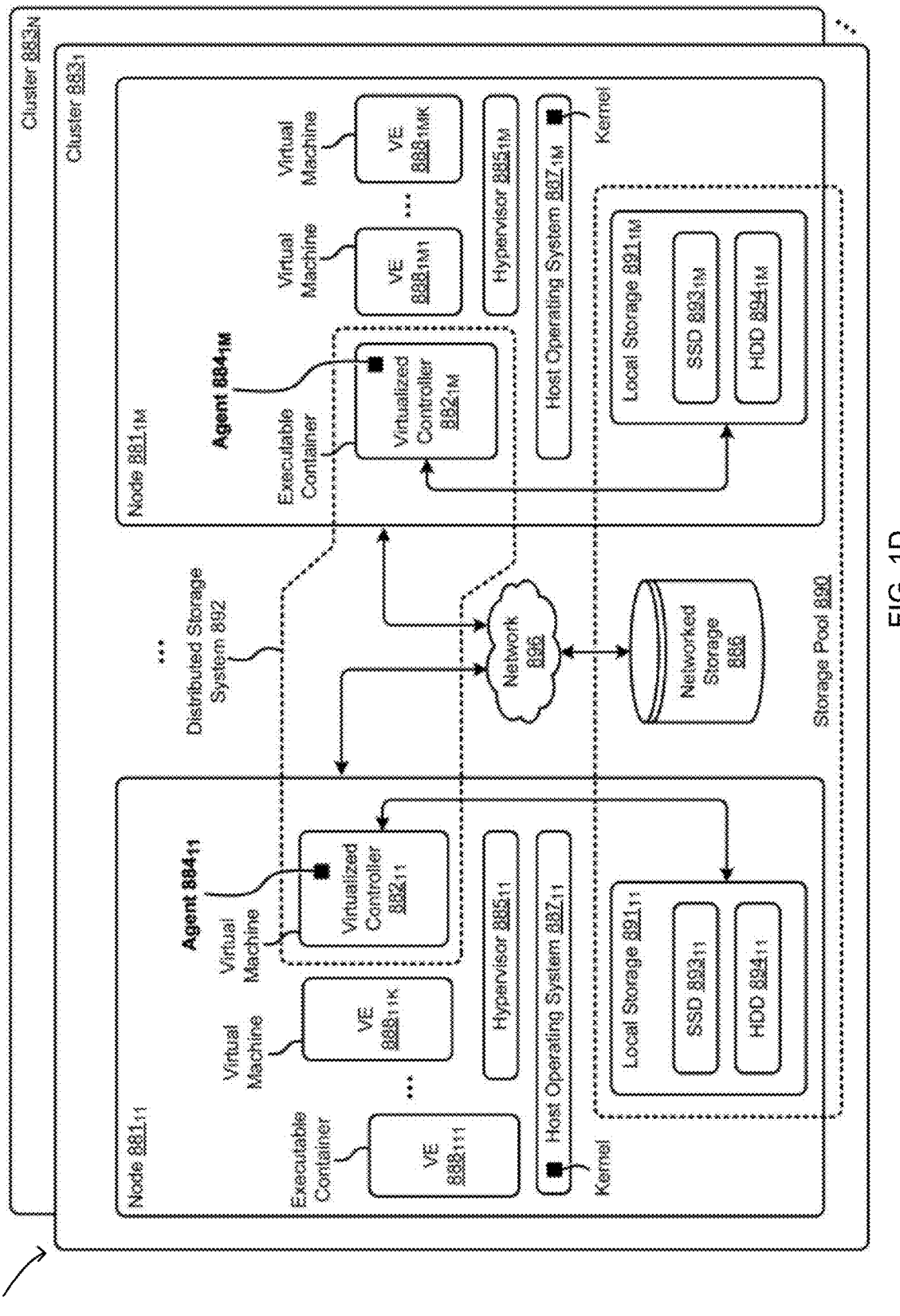

FIG. 1D is a block diagram illustrating virtualization system architecture 1D00 configured to implement one or more aspects of the present embodiments. As shown in FIG. 1D, virtualization system architecture 1D00 includes a distributed virtualization system that includes multiple clusters (e.g., cluster $883_1$, . . . , cluster $883_N$) comprising multiple nodes that have multiple tiers of storage in a storage pool. Representative nodes (e.g., node $881_{11}$, . . . , node $881_{1M}$) and storage pool 890 associated with cluster $883_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $891_{11}$, . . . , local storage $891_{1M}$). For example, the local storage can be within or directly attached to a server and/or appliance associated with the nodes. Such local storage can include solid state drives (SSD $893_{11}$, . . . , SSD $893_{1M}$), hard disk drives (HDD $894_{11}$, . . . , HDD $894_{1M}$), and/or other storage devices.

As shown, any of the nodes of the distributed virtualization system can implement one or more user virtualized entities (e.g., VE $888_{111}$, . . . , VE $888_{11K}$, . . . , VE $888_{1M1}$, . . . VE $888_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $887_{11}$, . . . , host operating system $887_{1M}$), while the VMs run multiple applications on various respective guest operating systems. Such flexibility can be facilitated at least in part by a hypervisor (e.g., hypervisor $885_{11}$, . . . , hypervisor $885_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, etc.) that are isolated from the node host computer and other containers. Such executable containers directly interface with the kernel of the host operating system (e.g., host operating system $887_{11}$, . . . , host operating system $887_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

In some embodiments, a particularly configured instance of a virtual machine at a given node can be used as a virtualized controller in a hypervisor-assisted virtualization environment to manage storage and I/O (input/output or IO) activities of any number or form of virtualized entities. For example, the virtualized entities at node $881_{11}$ can interface with a controller virtual machine (e.g., virtualized controller $882_{11}$) through hypervisor $885_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $882_{1M}$) in an operating system virtualization environment at a given node. In this case, for example, the virtualized entities at node $881_{1M}$ can access the storage pool 890 by interfacing with a controller container (e.g., virtualized controller $882_{1M}$) through hypervisor $885_{1M}$ and/or the kernel of host operating system $887_{1M}$.

In some embodiments, one or more instances of an agent can be implemented in the distributed storage system 892 to facilitate the herein disclosed techniques. Specifically, agent $884_{11}$ can be implemented in the virtualized controller $882_{11}$, and agent $884_{1M}$ can be implemented in the virtualized controller $882_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 2:
FIG. 2 is a block diagram illustrating a computer system configured to implement one or more aspects of the present embodiments.

FIG. 2 is a block diagram illustrating a computer system 200 configured to implement one or more aspects of the present embodiments. As shown, a server 201 within computer system 200 includes, without limitation, a processor 202 and a memory 204. The memory 204 includes, without limitation, a first machine learning model 212, a machine learning trainer 216, and an anomaly detection engine 218 including a second machine learning model 220. Server 201 of FIG. 2 can be included in any of the virtualization system architectures shown in FIGS. 1A-1D.

The computer system 200 is configured to receive a data set 206 including various sets of data points 208-1, 208-2.

The data points 208-1, 208-2 can be, for example, a set of metrics of a device such as a server and/or a set of logs of events recorded by a device. For example, the data set 206 can be a time series, such as a first set of one or more data points 208-1 collected and/or recorded at a first time and a second set of one or more data points 208-2 collected and/or recorded at a second time. In some embodiments, the data set 206 includes both metrics and logs. In some embodiments, the data set 206 includes data points 208 that are calculated over a data source, such as metrics that are calculated based on log entries in a log set. The data set 206 can include historical data occurring in the past and/or current data occurring in the present. The data set 206 can be collected in a supervised manner, such as a curated data set selected and labeled by a user, and/or an unsupervised manner, such as data collected from one or more servers without selection and/or labeling.

The anomaly detection engine 218 includes a second machine learning model 220 that is configured to generate predicted anomaly labels 210-2 for respective sets of one or more data points 208 of the data set 206. In some embodiments, the second machine learning model 220 includes a deep learning model for time series anomaly detection. The predicted anomaly labels 210-2 can include a first predicted anomaly label 210-2 indicating that a first portion 208-1 of the one or more data points 208 is an anomaly and a second predicted anomaly label 210-2 indicating that a second portion 208-2 of the one or more data points 208 is not an anomaly. In some embodiments, the second machine learning model 220 can generate additional predicted anomaly labels 210-2, such as different predicted anomaly labels 210-2 for different types of anomalies that could arise within the data set 206, confidence scores of the anomaly labeling, and/or the like. In some examples, the anomalies can represent performance metrics of a device that is malfunctioning or could do so in the future, such as processor usage, data transfer rates, memory or storage usage or capacity, network availability and performance, or the like. In some examples, the anomalies can represent access patterns that indicate misuse and/or malicious use of a device or service, such as unusual network traffic indicating access or attempts by unauthorized people and/or unusual software behavior an access pattern indicating the presence and operation of malware.

As previously discussed, the determination of anomalies in the data set 206 can change over time. As a first example, anomalies can arise within the data set 206 that are not detected by the second machine learning model 220. In particular, new anomaly types could occur within the data set 206, such as new access patterns could indicate a new form of malware or a new form of service misuse. In some cases, the second machine learning model 220 has not been trained to detect these new anomaly types. For example, the second machine learning model 220 could be trained to evaluate accesses of services, but not to distinguish between access patterns of commonly used services (e.g., requests directed to a webserver) and similar access patterns of rarely used services (e.g., requests directed to a fax service). Alternatively or additionally, in some cases, the second machine learning model 220 could be unable to reliably detect the anomalies. For example, a pattern of malicious use could evade detection by occurring at a low frequency over a longer period of time, resulting in data points 208 that are unusual but too infrequent for classification as an anomaly by the second machine learning model 220. These limitations of the second machine learning could result in false negatives. As a second example, data points 208 of the data set 206 that are not anomalies can be incorrectly determined as anomalies by the second machine learning model 220. For example, a user or service could begin using a service that has rarely been used in the recent past, such as a fax service. Because such usage might not have previously occurred and might not be consistent with recorded metrics or logs, the second machine learning model 220 could identify the usage as an anomaly as a false positive. As a result, the second machine learning model 220 could initiate additional monitoring or security processes due to the unusual but legitimate usage of the service.

In such scenarios, it can be desirable to retrain the second machine learning model 220 or to generate a replacement second machine learning model 220. In order to retrain the second machine learning model 220, an anomaly label 210 is associated with a first set of one or more data points 208-1 of the data set 206. For example, the server 201 can be configured to provide a user interface to a user. The user interface displays at least some of the data points 208 of the data set 206 and, optionally, a predicted anomaly label 210-2 generated by the second machine learning model 220 for at least one of the displayed one or more data points 208. The user interface can receive, from the user, a selection of the first set of one or more data points 208-1 of the data set 206 and a selection of an anomaly label 210-1 for the first set of one or more data points 208-1. The selected anomaly label 210-1 can indicate a false negative, that is, a first anomaly label indicating that the first set of one or more data points 208-1 is an anomaly. More particularly, the first anomaly label can indicate a failure by the second machine learning model 220 to determine that the first set of one or more data points 208-1 is an anomaly. The selected anomaly label 210-1 can also be, for example, a second anomaly label indicating that the first set of one or more data points 208-1 is not an anomaly. More particularly, the second anomaly label can indicate a false positive, that is, an incorrect determination by the second machine learning model 220 that the first set of one or more data points 208-1 is an anomaly when the one or more data points 208 are not an anomaly. Further details about the user interface are discussed with regard to FIG. 3.

The first machine learning model 212 receives the first set of one or more data points 208-1 and the associated anomaly label 210-1. In some embodiments, the first machine learning model 212 includes a reinforcement learning model for hyperparameter selection. Based on the first set of one or more data points 208-1 and the associated anomaly label 210-1, the first machine learning model 212 generates one or more hyperparameters 214 in order to retrain the second machine learning model 220 or to train a substitute second machine learning model 220. In some embodiments, for a data set 206 that includes a time series of data points 208, the one or more hyperparameters 214 includes a window size and/or sequence length (e.g., a number of data points 208 that are received as input and analyzed together by the second machine learning model 220). In some embodiments, for a data set 206 that includes a time series of data points 208, the one or more hyperparameters 214 includes a decay rate (e.g., a diminishing weight of past data points 208 in a stateful machine learning model, such as a recurrent neural network (RNN)). In some embodiments, the one or more hyperparameters 214 includes a structural feature of the second machine learning model 220, such as a model type, a number of layers, a layer type, a number of long short-term memory units, a number of repeat units, a number of neurons and/or filters included in a layer, an activation function, or the like. In some embodiments, the one or more hyperparameters 214 includes a training feature of the second machine learning model 220, such as a training algorithm or a training technique such as dropout or batch processing. In some embodiments, at least one of the one or more hyperparameters 214 is a parameter relating to the training of the second machine learning model 220, such as an objective function or loss function, an optimization function, a number of epochs, a batch size, an updated objective function, a loss function, a baseline, or the like. In some embodiments, the second machine learning model 220 determines anomalies in the data set 206 according to a baseline, and the one or more hyperparameters 214 includes a parameter of the baseline. Further details of the second machine learning model 220 are discussed below.

In some embodiments, the anomaly detection engine 218 can determine anomalies in the data set 206 according to a baseline. For example, the baseline can indicate sets of one or more data points 208 of the data set 206 that are not anomalies. As one such example, for a network device such as a router or webserver, the baseline can indicate a typical range of network traffic per period throughout a typical day, such as a volume of requests between 100,000 and 500,000 total requests for the day. Sets of one or more data points 208 that are within the range indicated by the baseline are determined to not be anomalies and sets of one or more data points 208 that are above or below the range indicated by the baseline are determined to be anomalous. In some embodiments, the window size is 1, wherein a scalar value of time series data (such as a value of the time-series data at time t) is evaluated relative to a baseline defined by one or more scalar parameters. In some embodiments, the window size is greater than 1, and an output of an aggregating function of a set of values within a window of the data series at time t (e.g., minimum, maximum, average, or the like) is evaluated relative to a baseline defined by scalar parameters. In some embodiments, the window size is greater than 1, and a vector of values within a window of the data series at time t (e.g., minimum, maximum, average, or the like) is evaluated relative to a baseline defined by vector parameters.

In various embodiments, the first machine learning model 212 can generate one or more hyperparameters 214 of the second machine learning model 220. For example (without limitation), based on the first set of data points 208-1 and the received anomaly label 210-1, the first machine learning model 212 can select or adjust at least one of a window size of the time series provided as input to the second machine learning model 220, a model type of the second machine learning model 220, a number of layers of the second machine learning model 220, a layer type of one or more layers of the second machine learning model 220, or the like. The machine learning trainer 216 can use the selected one or more hyperparameters 214 to retrain the second machine learning model 220 in a manner that adjusts the baseline to include sets of one or more data points 208 that are associated with anomaly labels 210 indicating data point(s) that are not anomalies, and to exclude sets of one or more data points 208 that are associated with anomaly labels 210 indicating anomalies.

In some embodiments, the first machine learning model 212 includes a neural architecture that receives, as input, one or more data points 208-1 and generates, as output, one or more values of hyperparameters of the second machine learning model 220. For example, the first machine learning model 212 can include a densely connected, feed-forward artificial neural network in which one or more layers of neurons apply weights and biases to the inputs in order to generate the outputs.

As a first example (without limitation), the first machine learning model can include an output layer with a first neuron that outputs a value indicating a window size of the data points 208 to be evaluated as an anomaly or not an anomaly. The second machine learning model 220 can include an input layer in which the number of neurons is based on the window size. For example, if the training data samples that are anomalies can be determined in a window size of five consecutive data points 208, the second machine learning model 220 can include an input layer with five neurons. In some cases, a smaller window size can enable the second machine learning model 220 to determine an anomaly faster than a large window size. However, if the training data samples that are anomalies can only be determined using a window size of twenty consecutive data points 208, the second machine learning model 220 can include an input layer with twenty neurons. In some cases, a larger window size can enable the second machine learning model 220 to determine an anomaly that occurs over a longer period of time.

As a second example (without limitation), the first machine learning model 212 can include an output layer with a first neuron that outputs a value indicating a number of layers to be included in the second machine learning model 220. Based on the training data set, the first machine learning model 212 can generate, as the output of the first neuron, a value indicating the number of layers to be included in the second machine learning model 220 to determine anomalies of the types indicated by the training data set. For example, if the training data samples that are anomalies are clearly distinguished with regard to training data samples that are not anomalies, the output of the first neuron can indicate a small number of layers (e.g., two neuron layers). A second machine learning model 220 including a small number of layers can have a small but sufficient learning capacity that is capable of distinguishing between anomalies and non-anomalies, and that is computationally efficient to train and apply to live time series data. However, if the training data samples that are anomalies are more difficult to distinguished with regard to training data samples that are not anomalies, the output of the first neuron can indicate a large number of layers (e.g., six or more neuron layers). A second machine learning model 220 including a large number of layers can require more computational resources to train and to apply to live time series data, but the larger layer count might be needed to provide enough learning capacity to distinguish accurately between anomaly data samples and non-anomaly data samples.

As a third example (without limitation), the first machine learning model 212 can generate hyperparameters that correspond to different activation functions, wherein a second machine learning model 220 including neurons that use a first non-linear activation function can more accurately distinguish between anomalies and non-anomalies than another second machine learning model 220 including neurons that use a second non-linear activation function. As yet another example of hyperparameter generation (without limitation), the first machine learning model 212 can generate hyperparameters that correspond to different loss types, wherein training a second machine learning model 220 using a first loss type can result in training that is faster or more computationally efficient than training a second machine learning model 220 using a second loss type.

In some embodiments, the machine learning trainer 216 receives a training data set. The training data set can include one or more labeled data samples, each labeled sample including a set of data points and an associated anomaly label 210 that indicate whether or not the data points are an anomaly. As a first example, a network device can receive network traffic throughout a day, and the time series data can indicate a volume of network traffic within respective periods of the day (e.g., one minute or one hour). The data point(s) for a particular period could be associated with a first data label indicating that the volume of network traffic within the period is an anomaly (e.g., atypically low volume, which could indicate a network outage, or atypically high volume, which could indicate a denial-of-service attack). Alternatively, the data points for a particular period could be associated with a second data label indicating that the volume of network traffic within the period is not an anomaly (e.g., within a typical range of the volume of network traffic during the period). As a second example, a storage device can indicate a data transfer rate for transferring data within respective periods of the day (e.g., one minute or one hour). The data point(s) for a particular period could be associated with a first data label indicating that the data transfer rate within the period is an anomaly (e.g., an atypically low data transfer rate, which could indicate an imminent failure of the storage device, or an atypically high data transfer rate, which could indicate an unusual data access pattern such as repeated reads of cached data). Alternatively, the data points for a particular period could be associated with a second data label indicating that the data transfer rate within the period is not an anomaly (e.g., within a typical range of the data transfer rate of the storage device during the period). The anomaly labels of the training data set could be selected by a user for the respective periods. Alternatively, the anomaly labels of the training data set could be predicted by the second machine learning model, and, optionally, could be verified as correct by a user.

In some embodiments, the machine learning trainer 216 trains the first machine learning model 212 to determine the hyperparameters 214 based on the training data set and a reinforcement learning process. For example, the first machine learning model 212 can perform a Markov decision process, in which the first machine learning model 212 selects an action to be performed based on a current state, and the action results in an updated state from which another action can be selected. The machine learning trainer 216 can train the first machine learning model 212 to perform a Markov decision process to learn a policy that indicates probabilities of actions to be taken in each possible state. The learned Markov decision process causes the first machine learning model 212 to choose one or more hyperparameters 214 that, when used to train the second machine learning model 220, cause the trained second machine learning model 220 to accurately determine anomalies in accordance with the baseline.

More particularly, the machine learning trainer 216 trains the first machine learning model 212 to learn a policy whereby the selection of the one or more hyperparameters 214 fulfills an objective, such as maximizing a reward function and/or minimizing a cost function. In some embodiments, the machine learning trainer 216 measures the performance of the first machine learning model 212 based on a cost function that includes a difference between one or more current hyperparameters 214 for the second machine learning model 220 and one or more updated hyperparameters 214 for the second machine learning model 220. In some such embodiments, the machine learning trainer 216 uses the following cost function:

$$c(t) \triangleq (1-d)c(t-1) + d(T(t) - f(t, S)), \qquad \text{EQ. 1}$$

wherein, c(t) represents the cost of the anomaly detection function at time t, d represents a decay applied to a cost of the anomaly detection function at time t−1, T(t) represents a portion of the time series data at time t, S represents a set of one or more hyperparameters generated by the first machine learning model 212 for the second machine learning model 220, and $f(t,S)$ represents a predicted time series that is a parametric function of the set of hyperparameters based on a second machine learning model using the set of one or more hyperparameters S.

In various embodiments that use the cost function of EQ. 1, the machine learning trainer 216 trains the first machine learning model 212 based on the one or more hyperparameters S that are selected to minimize the cost function. More particularly, the machine learning trainer 216 selects the weights of the first machine learning model 212 in order to choose the one or more hyperparameters S that would minimize the cost function shown in EQ. 1. For example, based on receiving a training data sample that is a false positive, minimizing the cost function reduces a difference between the time series data sample T(t) and the predicted time series parametric function $f(t,S)$ so that the second machine learning model instead classifies the time series data sample T(t) as not an anomaly. That is, the parametric function $f(t,$ indicates whether a second machine learning model 220 based on the one or more hyperparameters S would classify the time series data T(t) as an anomaly or not an anomaly. The machine learning trainer 216 trains the first machine learning model 212 to choose the set of one or more hyperparameters S that would minimize the cost function, that is, that would improve the accuracy of classifying the time series data sample T(t) as not an anomaly. As another example, based on receiving a training data sample that is a false negative, the machine learning trainer 216 could use a different cost function based on a reciprocal of the difference between the time series data sample T(t) and the predicted time series parametric function $f(t,S)$ so that the second machine learning model instead classifies the time series data sample T(t) as an anomaly. The machine learning trainer 216 trains the first machine learning model 212 to choose the set of one or more hyperparameters S that would minimize this different cost function, that is, that would improve the accuracy of classifying the time series data sample T(t) as an anomaly.

In some embodiments, the machine learning trainer 216 trains the first machine learning model 212 to learn a policy (such as a policy of minimizing the cost function of EQ. 1) through reinforcement learning. In various embodiments, the machine learning trainer 216 trains the first machine learning model 212 using various reinforcement learning (RL) training processes. Many such RL training processes can be suitable for RL-based training the second machine learning model 220, including a state-action-reward-state-action (SARSA) reinforcement learning process, and/or the like. In some embodiments, the machine learning trainer 216 selects the policy through reinforcement learning based on a Q-learning approach, in which selecting the hyperparameters $\alpha$, $\beta$ relative to the current state based on the current hyperparameters $\alpha_0$, $\beta_0$ pursues an objective. As one such example, the machine learning trainer 216 can evaluate combinations of weights of the first machine learning model 212 based on an E-greedy selection process, including some combinations of the weights that are predicted to minimize the cost function based on the current state ("exploitation") and some combinations of the weights that could produce further minimization of the cost function from the current state ("exploration"). The machine learning trainer 216 can use a variety of heuristics to evaluate the combinations of weights. As a first example, the machine learning trainer 216 could evaluate combinations of weights based on a convergence heuristic, e.g., a magnitude threshold of the magnitude of weight adjustments for each training epoch, wherein training is completed when the magnitude during an epoch falls below the magnitude threshold. As a second example, the machine learning trainer 216 could evaluate combinations of weights based on an overtraining heuristic, e.g., comparing the performance of the first machine learning model 212 on both training data and validation data during each training epoch, wherein training is completed when the improvement of performance on the training data diverges from the improvement of performance on the validation data. Iteratively testing combinations of the weights of the first machine learning model 212 enables the machine learning trainer 216 to determine a policy for the first machine learning model 212 that satisfies the objective, such as reducing the cost function shown in EQ. 1.

In some embodiments, the second machine learning model 220 includes a neural architecture for processing time series data. As a first example, the second machine learning model 220 can include a recurrent neural network that receives, as input, one or more data points 208 of a time series data as well as a previous output of the recurrent neural network for a preceding data point 208 of the time series data. As a second example, the second machine learning model 220 can include a long short-term-memory (LSTM) recurrent neural network or a gated recurrent unit (GRU) that includes one or more memory cells. The selection of a neural architecture including a memory cell can aid the processing of time series data to determine anomalies. For example, the determination of the anomaly can include a comparison of a first data point 208 occurring earlier in the time series data with a second data point 208 occurring later in the time series data, and the second machine learning model 220 can store information in the memory cell while processing the first data point 208 for comparison while processing the second data point 208.

In some embodiments, the machine learning trainer 216 prepares a training data set to train and/or retrain the second machine learning model 220. As a first example, the training data set can include one or more data points 208 collected from time series data, such as performance metrics of a processor, a storage device, a network component, or the like. As a second example, the training data set can include one or more data points 208 derived from events recorded in an event log, such as an occurrence, frequency, volume, etc., of accesses of or by a particular resource. In some embodiments, the machine learning trainer 216 processes the data set to prepare the training data set, such as sample balancing, sample normalization, or the like.

In some embodiments, the training data set includes only the first set of one or more data points 208-1 that are associated with the anomaly label 210-1. In some embodiments, the training data set also includes other data points 208 collected in a same or similar time period, such as a 24-hour period of data points 208 that includes the data points 208-1 associated with the anomaly label 210-1. In some embodiments, the training data set also includes other data points 208 collected in the past, such as metrics or logs from historical data. The other data points 208 could be randomly sampled from the historical data, such as metrics or logs from arbitrarily selected time periods. The other data points 208 could be selected due to a correspondence with the one or more data points 208-1 and the anomaly label 210-1, such as historical data from the same time of day or day of the week as the one or more data points 208-1 and the anomaly label 210-1. The other data points 208 could be selected due to a contrast with the one or more data points 208-1 and the anomaly label 210-1, such as metrics or logs that do not include the access pattern of the one or more data points 208-1, or metrics or logs that are similar to the one or more data points 208-1 but were correctly labeled by the second machine learning model 220. In some embodiments, the machine learning trainer 216 uses the same training data set to generate the one or more hyperparameters by the first machine learning model 212 and to train the second machine learning model 220. In some embodiments, the machine learning trainer 216 uses different training data sets to generate the one or more hyperparameters by the first machine learning model 212 and to train the second machine learning model 220.

The processor 202 executes the machine learning trainer 216 to train or retrain the second machine learning model 220, using the one or more hyperparameters 214, to determine anomalies in the data set 206. For example, the second machine learning model 220 can be a neural network including a series of layers of neurons. In various embodiments, the neurons of each layer are at least partly connected to, and receive input from, an input source and/or one or more neurons of a previous layer. Each neuron can multiply each input by a weight; process a sum of the weighted inputs using an activation function; and provide an output of the activation function as the output of the artificial neural network and/or as input to a next layer of the artificial neural network. In some embodiments, at least one of the one or more hyperparameters 214 indicates a feature of the neural architecture of the second machine learning model 220, such as a type of machine learning model, a number of neuron layers, a number of neurons in a neuron layer, and/or or the interconnections between the neuron layers. Alternatively or additionally, in some embodiments, at least one of the one or more hyperparameters 214 is a parameter of an objective function or loss function, and the training of the second machine learning model 220 is based on the updated objective function, loss function, a baseline, or the like. The machine learning trainer 216 can retrain the second machine learning model 220 using the updated objective function, loss function, baseline, or the like, as indicated by the one or more hyperparameters 214. The training can be further based on the first set of one or more data points 208-1 and the anomaly label 210-1, and, optionally, a previous training data set of other data points 208 associate with anomaly labels 210.

In some embodiments, the machine learning trainer 216 retrains the second machine learning model 220 by re-performing or continuing a previous training technique. For example, the machine learning trainer 216 could continue training the second machine learning model 220 with the updated training data set and/or with a different loss function based on the updated hyperparameters 214. Alternatively or additionally, in some embodiments, the machine learning trainer 216 trains a replacement machine learning model to replace the second machine learning model 220 that is based on the updated hyperparameters 214. As an example, replacing the second machine learning model 220 could include a reinitialization of the second machine learning model 220 (e.g., resetting weights and/or biases of the second machine learning model 220 to zero or to random values). As another example, replacing the second machine learning model 220 could include generating a new second machine learning model 220 of a different type and/or a different architecture, such as a different number or configuration of layers. The machine learning trainer 216 can generate and train a replacement machine learning model with a neural architecture based on the one or more hyperparameters 214 and then replace the existing second machine learning model 220 with the fully trained replacement machine learning model. In some embodiments, the machine learning trainer 216 validates the training of the second machine learning model 220 during training in order to confirm the suitability of the selected one or more hyperparameters 214 for retraining the second machine learning model 220. In some embodiments, the machine learning trainer 216 tests the trained second machine learning model 220 after training, such as by comparing anomaly labels 210 of data points 208 that were not used during training with predicted anomaly labels generated by the second machine learning model 220.

Some embodiments of the disclosed techniques include different architectures than as shown in FIG. 2. As a first such example, various embodiments include various types of processors 202. In various embodiments, the processor 202 includes a central processing unit (CPU), a graphics processing unit (GPU), a tensor processing unit (TPU), an application-specific integrated circuit (ASIC), or the like. Some embodiments include two or more processors 202 of a same or similar type (e.g., two or more CPUs of the same or similar types). Alternatively or additionally, some embodiments include processors 202 of different types (e.g., two CPUs of different types; one or more CPUs and one or more GPUs or TPUs; or one or more CPUs and one or more FPGAs). In some embodiments, two or more processors 202 perform a part of the disclosed techniques in tandem (e.g., each CPU training the second machine learning model 220 over a subset of the data set 206). Alternatively or additionally, in some embodiments, two or more processors 202 respectively perform different parts of the disclosed techniques (e.g., one CPU executing the machine learning trainer 216 to train the second machine learning model 220, and one CPU applying the second machine learning model 220 to detect anomalies).

As a second such example, various embodiments include various types of memory 204. Some embodiments include two or more memories 204 of a same or similar type (e.g., a Redundant Array of Disks (RAID) array). Alternatively or additionally, some embodiments include two or more memories 204 of different types (e.g., one or more hard disk drives and one or more solid-state storage devices). In some embodiments, two or more memories 204 store a component (e.g., storing the data set 206 to span two or more memories 204). Alternatively or additionally, in some embodiments, a first memory 204 stores a first component (e.g., the data set 206) and a second memory 204 stores a second component (e.g., the machine learning trainer 216).

As a third such example, some disclosed embodiments include different implementations of the machine learning trainer 216. In some embodiments, at least part of the machine learning trainer 216 is embodied as a program in a high-level programming language (e.g., C, Java, or Python), including a compiled product thereof. Alternatively or additionally, in some embodiments, at least part of the machine learning trainer 216 is embodied in hardware-level instructions (e.g., a firmware that the processor 202 loads and executes). Alternatively or additionally, in some embodiments, at least part of the machine learning trainer 216 is a configuration of a hardware circuit (e.g., configurations of the lookup tables within the logic blocks of one or more FPGAs). In some embodiments, the memory 204 includes additional components (e.g., machine learning libraries used by the machine learning trainer 216).

As a fourth such example, instead of one server 201, some disclosed embodiments include two or more servers 201 that together apply the disclosed techniques. Some embodiments include two or more servers 201 that perform one operation (e.g., a first server 201 and a second server 201 that respectively train the second machine learning model 220 over different parts of the data set 206). Alternatively or additionally, some embodiments include two or more servers 201 that execute different parts of one operation (e.g., a first server 201 that displays a user interface for a user, and a second server 201 that executes the machine learning trainer 216). Alternatively or additionally, some embodiments include two or more servers 201 that perform different operations (e.g., a first server 201 that trains the second machine learning model 220 and a second server 201 that applies the second machine learning model 220 to detect anomalies). In some embodiments, two or more servers 201 communicate through a localized connection, such as through a shared bus or a local area network. Alternatively or additionally, in some embodiments, two or more servers 201 communicate through a remote connection, such as the Internet, a virtual private network (VPN), or a public or private cloud.

Figure 3:
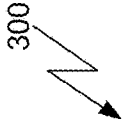
FIG. 3 is an illustration of a user interface of the virtualization system architectures of FIGS. 1A-1D or the computer system 200 of FIG. 2 according to various embodiments.
Figure 3:
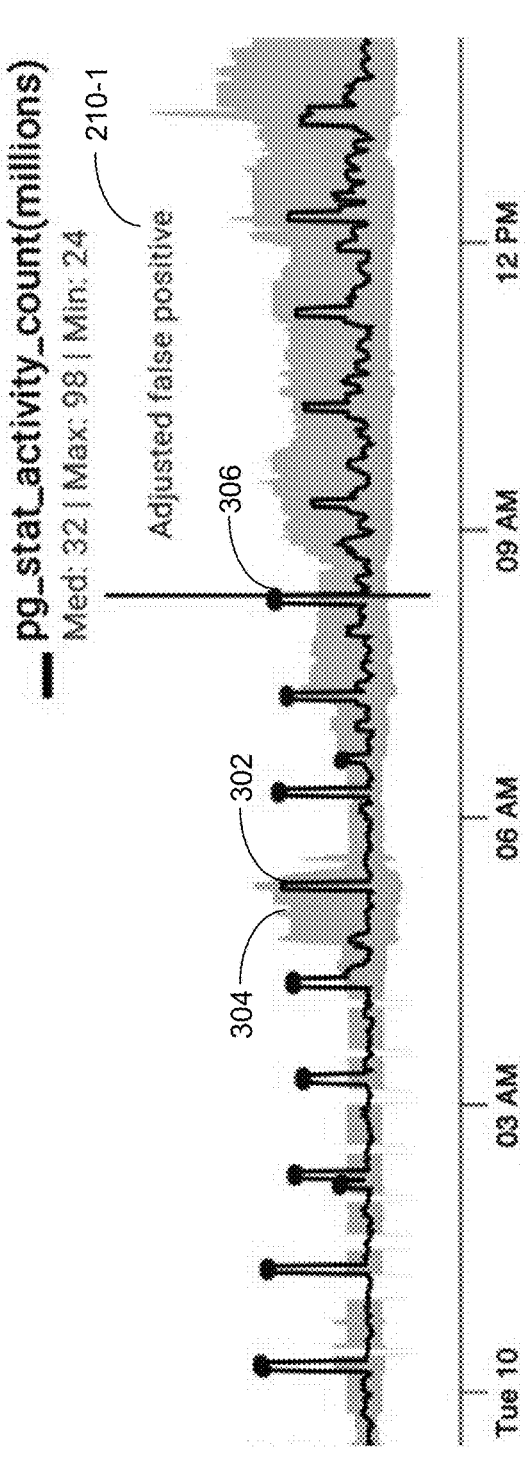

FIG. 3 is an illustration of a user interface 300 of the virtualization system architectures of FIGS. 1A-1D or the computer system 200 of FIG. 2. As shown, the user interface 300 of FIG. 3 shows at least some of the data points 208 of the data set 206 and includes an option to select an anomaly label 210.

As shown, the user interface 300 includes a time series of data points 208 of the data set 206 (e.g., traffic metrics collected from one or more network devices such as routers or webservers). The user interface 300 shows a data point series 302 (e.g., a plot) of individual data points 208 collected at certain dates and times). The user interface 300 also shows a baseline data series 304 indicating a baseline corresponding to each data point 208 (e.g., a typical range of metrics that are collected within previous time periods that correspond to the data point 208). Based on a comparison of each data point 208 with the baseline, the user interface 300 can indicate a selected data point 306 that exceeds the baseline, and that is therefore determined by the second machine learning model 220 to be an anomaly. The user interface 300 can be configured to receive, from a user, a selection of the selected data point 306 and a selection of a corrected anomaly label 210-1 by which the user can indicate that the selected data point 306 is or is not an anomaly. As shown, the user interface 300 receives a selection of an anomaly label 210 indicating that the selected data point 306 is not an anomaly, even though it exceeds the baseline shown by the baseline data series 304. In some embodiments, the user interface 300 is configured to receive a selection of a range of the data point series 302 and a selection of an anomaly label 210 that indicates whether the set of one or more data points 208 within the range are or are not an anomaly.

Based on the received selection of the one or more data point 208 and the received selection of the anomaly label 210, the first machine learning model 212 selects one or more hyperparameters 214 for a second machine learning model 220 that determines whether a portion of the one or more data points 208 are an anomaly or not an anomaly. The machine learning trainer 216 then retrains the second machine learning model 220 based on the one or more hyperparameters 214, in addition to the selected one or more data points 208 and the selected anomaly label 210.

In some embodiments, after the training, the user interface 300 receives a predicted anomaly label 210-2 for the one or more data points 208 (e.g., an updated anomaly prediction by the retrained second machine learning model 220) and displays the predicted anomaly label 210-2 for the one or more data points 208. Displaying the predicted anomaly label 210-2 for the one or more data points 208 can inform the user as to an updated or adjusted performance of the second machine learning model 220 in detecting anomalies. In some embodiments, the user interface 300 displays an updated baseline by which the set of one or more updated data points is classified as an anomaly or as not an anomaly. In some embodiments, the display can show both the anomaly labels 210 predicted by the initial second machine learning model 220 (e.g., before retraining or replacement) and the anomaly labels 210 predicted by the retained or replacement machine learning model 220.

In some embodiments, the anomaly detection engine 218 applies the trained or retrained second machine learning model 220 to the data set 206 after the training to detect anomalies in the data set 206. For example, a second set of one or more data points 208-2 can be received or recorded in the data set 206 after the first set of one or more data points 208-1. After the training or retraining of the second machine learning model 220, an anomaly detection engine 218 can apply the second machine learning model 220 to the second set of one or more data points 208-2. The second machine learning model 220 predicts a second anomaly label 210-2 for the second set of one or more data points 208-2. Further, in some embodiments, the anomaly detection engine 218 can generate an action in response to the second machine learning model 220 detecting a second anomaly in the data set 206. For example, the anomaly detection engine 218 can generate an alert, send a message to a user, generate a report, or the like.

In some embodiments, a set of servers provides one or more performance metrics, wherein each performance metric indicates a performance of at least one server of the set of servers. For example, the performance metrics can be a volume of network traffic, a number of network requests received or fulfilled, an average or maximum latency of fulfilling network requests, a network data transfer rate, or the like. The set of servers also provides one or more logs, wherein each log indicates one or more events arising within at least one server of the set of servers. A time series data set represents the one or more performance metrics and the one or more logs over a period of time, such as hours, days, or weeks. A user interface (such as the user interface 300 of FIG. 3) displays the time series data set as a time series plot for a user. Based on a selection, by the user, of a portion of the time series plot and a designation of the portion as either an anomaly or as not an anomaly, the user interface 300 associates an anomaly label 210 with the corresponding data points 208 of the time series data set. As one example, the anomaly can be an unusual performance metric of a hardware device, such as an unusually high error rate reported by a storage device. As another example, the anomaly can be an unusual pattern of network activity, such as requests directed toward a server that could indicate a denial-of-service attack. As yet another example, the anomaly can be an unusual behavior of a process, such as an unusually high memory or processor usage or unusual attempts by the process to access protected resources.

Based on the user-selected anomaly label 210-1 correcting the predicted anomaly label 210-2 corresponding to data point(s) 306, a first machine learning model 212 generates one or more hyperparameters 214 for training a second machine learning model 220. A machine learning trainer 216 trains a second machine learning model 220, using a reinforcement learning process based on the one or more hyperparameters, to determine anomalies. The reinforcement learning process causes the second machine learning model 220 to learn a policy that classifies the identified one or more data points 208 as an anomaly according to the anomaly label 210. In some embodiments, the policy of the second machine learning model causes a Markov decision process to choose actions within each state that maximize a reward provided by a reward function, wherein the reward function is based on an objective. For example, the reward can be inversely proportional to a time of the Markov decision process to satisfy the objective, or the like.

In some embodiments, the anomaly detection engine 218 uses the trained second machine learning model 220 to evaluate one or more additional performance metrics and one or more additional logs received from the set of servers in order to detect an anomaly. The anomaly can be, for example, an unusual performance metric of a hardware device, an unusual pattern of network activity, an unusual behavior of a process, or the like. In response to determining an anomaly, the anomaly detection engine 218 can perform one or more actions. In some embodiments, the anomaly detection engine 218 responds to the determination of an anomaly by starting at least one process on at least one server of the set of servers. For example, the anomaly detection engine 218 can initiate a security or audit process that scans a server exhibiting an anomaly for vulnerabilities or the presence of malware. In some embodiments, the anomaly detection engine 218 responds to the determination of an anomaly by stopping at least one process on at least one server of the set of servers. For example, the anomaly detection engine 218 can suspend or terminate a process or service occurring on a server due to the process or service consuming an unusual amount of resources or attempting an unauthorized access of a protected resource. In some embodiments, the anomaly detection engine 218 responds to the determination of an anomaly by mitigating an availability of a resource, such as slowing processing of a service or process, reducing network capacity for the service or process, or limiting a storage capacity available to the service or process. In some embodiments, the anomaly detection engine 218 responds to the determination of an anomaly by migrating at least one resource from one server of the set of servers to a different server of the set of servers. For example, the anomaly detection engine 218 can relocate a data set or a process from a server that exhibits signs of imminent failure to a failover server.

FIG. 4 illustrates a flow diagram of method steps for configuring the computer system of FIG. 2 to detect anomalies, according to various embodiments. The method steps of FIG. 4 can be performed, e.g., to detect anomalies in the data set 206 of the virtualization system architectures of FIGS. 1A-1D or the computer system 200 of FIG. 2. Some embodiments can include the user interface 300 of FIG. 3.

As shown, a method 400 begins at step 402 in which the computer system receives, for one or more data points of a data set, an anomaly label indicating whether the one or more data points is an anomaly. The one or more data points can be determined from one or more performance metrics, one or more logs, or the like. In some embodiments, the one or more data points are received through a user interface (e.g., a selection of a range of data points in a time series). In some embodiments, the anomaly label is received through a user interface (e.g., a selection of an anomaly label indicating that the data points that the second machine learning model 220 classified as not an anomaly are actually an anomaly (e.g., a false negative), or a selection of an anomaly label indicating that the data points that the second machine learning model 220 classified as an anomaly are actually not an anomaly (e.g., a false positive).

At step 404, the computer system generates, using a first machine learning model, one or more hyperparameters based on the one or more data points and the anomaly label. In some embodiments, the computer system selects one or more hyperparameters according to a cost function, such as EQ. 1. In some embodiments, the computer system selects the hyperparameters so that the updated baseline can classify the received one or more data points as an anomaly (e.g., based on a selection of an anomaly label indicating that the selected data points are an anomaly or are a false negative). In some embodiments, the computer system selects the hyperparameters so that the updated baseline can classify the received one or more data points as not an anomaly (e.g., based on a selection of an anomaly label indicating that the selected data points are not an anomaly or are a false positive).

At step 406, the computer system trains a second machine learning model to determine anomalies in the data set, wherein the training is performed using the one or more hyperparameters. In some embodiments, a reinforcement learning (RL) process, such as SARSA, is used to train a Markov decision process to learn a policy that maximizes an objective. In some embodiments, the objective is to adjust the output of the second machine learning model to generate a predicted anomaly label that matches the received anomaly label, such as a ground-truth label of the first set of one or more data points. In some embodiments, the training at step 406 is performed until the second machine learning model generates a predicted anomaly label for the one or more data points that matches the received anomaly label.

At step 408, the computer system receives, from the trained second machine learning model, a predicted anomaly label for the one or more data points. The predicted anomaly label can indicate an anomaly from the one or more performance metrics and/or one or more logs, such as an unusual performance metric of a hardware device, an unusual pattern of network activity, an unusual behavior of a process, or the like.

At step 410, the computer system displays the predicted anomaly label for the one or more data points. In some embodiments, a user interface displays the updated predicted anomaly label for selected one or more data points, and, optionally, an updated baseline by which the one or more updated data points are classified as an anomaly or not an anomaly. After step 410, the computer system returns to step 402 and receives a second anomaly label for further training or retraining of the second machine learning model.

In sum, techniques for adjusting a machine learning model to detect an anomaly label in a data set include training the machine learning model based on one or more hyperparameters that is selected by another machine learning model. The techniques include receiving an anomaly label that indicates whether or not one or more data points of a data set are an anomaly. The techniques further include generating one or more hyperparameters using a first machine learning model based on the one or more data points and the anomaly label. The second machine learning model is then trained or retrained based on the one or more data points, the anomaly label, and the one or more hyperparameters. The retrained second machine learning model is rapidly trained or retrained, based on the one or more hyperparameters, make correct predictions of the received anomaly label for the one or more data points.

At least one technical advantage of the disclosed techniques relative to the prior art is that, with the disclosed techniques, the second machine learning model is rapidly trained or retrained to detect anomalies including a correct anomaly label for the one or more data points. For example, while manual selection or adjustment of the hyperparameters and/or rules-based approaches can take weeks or months to update the second machine learning model, generating the hyperparameters by the first machine learning model can enable the second machine learning model to be updated in less than a day. As a result, updating the second machine learning model according as disclosed herein can quickly adapt the anomaly detection to new patterns in the data set in order to detect newly identified anomalies and/or to reduce recent incorrect determinations of anomalies. Further, anomaly detection can be quickly achieved by the disclosed techniques with reduced user involvement, which can enable users to adjust the anomaly detection system faster, easier, and without requiring a familiarity with machine learning models or training. These technical advantages provide one or more technological improvements over prior art approaches.

1. In some embodiments, one or more non-transitory computer-readable media store program instructions that, when executed by one or more processors, cause the one or more processors to perform a method comprising: receiving, for one or more data points of a data set, an anomaly label indicating whether the one or more data points are an anomaly, generating, using a first machine learning model, one or more hyperparameters based on the one or more data points and the anomaly label, and training a second machine learning model to determine anomalies in the data set, wherein the training is performed using the one or more hyperparameters.

2. The one or more non-transitory computer-readable media of clause 1, wherein the data set includes at least one of a set of metrics of a system or a set of logs of the system.

3. The one or more non-transitory computer-readable media of clauses 1 or 2, wherein the anomaly label is received through a user interface as a selection of the one or more data points of the data set and a selection of the anomaly label.

4. The one or more non-transitory computer-readable media of any of clauses 1-3, wherein the anomaly label indicates either an incorrect determination by the second machine learning model that the one or more data points correspond to an anomaly or a failure by the second machine learning model to determine that the one or more data points correspond to an anomaly.

5. The one or more non-transitory computer-readable media of any of clauses 1-4, wherein the training includes at least one of retraining of the second machine learning model or training a replacement machine learning model to replace the second machine learning model.

6. The one or more non-transitory computer-readable media of any of clauses 1-5, wherein the method further comprises: displaying a predicted anomaly label for the one or more data points received from the second machine learning model after the training.

7. The one or more non-transitory computer-readable media of any of clauses 1-6, wherein the method further comprises: applying the second machine learning model, after the training, to detect anomalies in the data set.

8. The one or more non-transitory computer-readable media of any of clauses 1-7, wherein the one or more hyperparameters includes one or more of a window size, a sequence length, a number of long short-term memory units, a number of repeat units, a number of training epochs, a training batch size, an optimization function, an activation function, a loss function, or a decay rate.

9. The one or more non-transitory computer-readable media of any of clauses 1-8, wherein the second machine learning model determines anomalies in the data set according to a baseline.

10. The one or more non-transitory computer-readable media of any of clauses 1-9, wherein a baseline for determining anomalies is determined according to a baseline equation.

11. The one or more non-transitory computer-readable media of any of clauses 1-10, wherein the method further includes training the first machine learning model based on a reinforcement learning process.

12. The one or more non-transitory computer-readable media of any of clauses 1-11, wherein the method further includes training the first machine learning model based on a cost function including a difference between one or more current hyperparameters for the second machine learning model and one or more updated hyperparameters for the second machine learning model.

13. In some embodiments, a system comprises a memory that stores instructions, and a processor that is coupled to the memory and, when executing the instructions, is configured to receive, for one or more data points of a data set, an anomaly label indicating whether the one or more data points are an anomaly, generate, using a first machine learning model, one or more hyperparameters based on the one or more data points and the anomaly label, and train a second machine learning model to determine anomalies in the data set, wherein the training is performed using the one or more hyperparameters.

14. The system of clause 13, wherein the data set includes at least one of a set of metrics or a set of logs.

15. The system of clauses 13 or 14, wherein the anomaly label is received through a user interface as a selection of the one or more data points of the data set and a selection of the anomaly label.

16. The system of any of clauses 13-15, wherein the anomaly label indicates either an incorrect determination by the second machine learning model that the one or more data points are an anomaly or a failure by the second machine learning model to determine that the one or more data points are an anomaly.

17. The system of clauses 13-16, wherein the training includes at least one of retraining of the second machine learning model or training a replacement machine learning model to replace the second machine learning model.

18. The system of clauses 13-17, wherein the processor is further configured, when executing the instructions, to display a predicted anomaly label for the one or more data points received from the second machine learning model after the training.

19. The system of clauses 13-18, wherein the processor is further configured, when executing the instructions, to apply the second machine learning model, after the training, to detect anomalies in the data set.

20. The system of clauses 13-19, wherein the one or more hyperparameters includes one or more of, a window size, a sequence length, a number of long short-term memory units, a number of repeat units, a number of training epochs, a training batch size, an optimization function, an activation function, a loss function, or a decay rate.

21. The system of clauses 13-20, wherein the second machine learning model determines anomalies in the data set according to a baseline.

22. The system of clauses 13-21, wherein a baseline for determining anomalies is determined according to a baseline equation.

23. The system of clauses 13-22, wherein the processor is further configured, when executing the instructions, to train the first machine learning model based on a reinforcement learning process.

24. The system of clauses 13-23, wherein the processor is further configured, when executing the instructions, to train the first machine learning model based on a cost function including a difference between one or more current hyperparameters for the second machine learning model and one or more updated hyperparameters for the second machine learning model.

25. In some embodiments, a computer-implemented method comprises: receiving, for one or more data points of a data set, an anomaly label indicating whether the one or more data points are an anomaly; generating, using a first machine learning model, one or more hyperparameters based on the one or more data points and the anomaly label; and training a second machine learning model to determine anomalies in the data set, wherein the training is performed using the one or more hyperparameters.

26. The computer-implemented method of clause 25, wherein the data set includes at least one of a set of metrics of a system or a set of logs of the system.

27. The computer-implemented method of clauses 25 or 26, wherein the anomaly label is received through a user interface as a selection of the one or more data points of the data set and a selection of the anomaly label.

28. The computer-implemented method of any of clauses 25-27, wherein the anomaly label indicates either an incorrect determination by the second machine learning model that the one or more data points are an anomaly or a failure by the second machine learning model to determine that the one or more data points are an anomaly.

29. The computer-implemented method of any of clauses 25-28, wherein the training includes at least one of retraining of the second machine learning model or training a replacement machine learning model to replace the second machine learning model.

30. The computer-implemented method of any of clauses 25-29, further comprising: displaying a predicted anomaly label for the one or more data points received from the second machine learning model after the training.

31. The computer-implemented method of any of clauses 25-30, further comprising: applying the second machine learning model, after the training, to detect anomalies in the data set.

32. The computer-implemented method of any of clauses 25-31, wherein the one or more hyperparameters includes one or more of, a window size, a sequence length, a number of long short-term memory units, a number of repeat units, a number of training epochs, a training batch size, an optimization function, an activation function, a loss function, or a decay rate.

33. The computer-implemented method of any of clauses 25-32, wherein the second machine learning model determines anomalies in the data set according to a baseline.

34. The computer-implemented method of any of clauses 25-33, wherein a baseline for determining anomalies is determined according to a baseline equation.

35. The computer-implemented method of any of clauses 25-34, further comprising: training the first machine learning model based on a reinforcement learning process.

36. The computer-implemented method of any of clauses 25-35, further comprising: training the first machine learning model based on a cost function including a difference between one or more current hyperparameters for the second machine learning model and one or more updated hyperparameters for the second machine learning model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, for example, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform a method comprising:

receiving, for one or more data points of a data set, an anomaly label indicating an error in a determination by a second machine learning model about whether the one or more data points correspond to an anomaly, generating, using a first machine learning model, one or more updated hyperparameters based on the one or more data points and the anomaly label, wherein the first machine learning model is trained to minimize a cost function that incorporates a previous cost state weighted by a decay rate and a difference between a time-series data sample and a predicted time series that is a parametric function of the one or more updated hyperparameters, and training the second machine learning model to determine anomalies in the data set, wherein the training is performed using the one or more updated hyperparameters.

2. The one or more non-transitory computer-readable media of claim 1, wherein the data set includes at least one of a set of metrics of a system or a set of logs of the system.

3. The one or more non-transitory computer-readable media of claim 1, wherein the anomaly label is received through a user interface as a selection of the one or more data points of the data set and a selection of the anomaly label.

4. The one or more non-transitory computer-readable media of claim 1, wherein the error in the determination comprises an incorrect determination by the second machine learning model that the one or more data points correspond to the anomaly.

5. The one or more non-transitory computer-readable media of claim 1, wherein the training includes at least one of retraining of the second machine learning model or training a replacement machine learning model to replace the second machine learning model.

6. The one or more non-transitory computer-readable media of claim 1, wherein the method further comprises: displaying a predicted anomaly label for the one or more data points received from the second machine learning model after the training.

7. The one or more non-transitory computer-readable media of claim 1, wherein the method further comprises: applying the second machine learning model, after the training, to detect anomalies in the data set.

8. The one or more non-transitory computer-readable media of claim 1, wherein the one or more updated hyperparameters includes one or more of a window size, a sequence length, a number of long short-term memory units, a number of repeat units, a number of training epochs, a training batch size, an optimization function, an activation function, a loss function, or the decay rate.

9. The one or more non-transitory computer-readable media of claim 1, wherein the second machine learning model determines anomalies in the data set according to a baseline.

10. The one or more non-transitory computer-readable media of claim 1, wherein a baseline for determining anomalies is determined according to a baseline equation.

11. The one or more non-transitory computer-readable media of claim 1, wherein the method further includes training the first machine learning model based on a reinforcement learning process.

12. The one or more non-transitory computer-readable media of claim 1, wherein the error in the determination comprises a failure by the second machine learning model to determine that the one or more data points correspond to the anomaly.

13. A system, comprising:

a memory that stores instructions, and a processor that is coupled to the memory and, when executing the instructions, is configured to:

receive, for one or more data points of a data set, an anomaly label indicating an error in a determination by a second machine learning model about whether the one or more data points correspond to an anomaly, generate, using a first machine learning model, one or more updated hyperparameters based on the one or more data points and the anomaly label, wherein the first machine learning model is trained to minimize a cost function that incorporates a previous cost state weighted by a decay rate and a difference between a time-series data sample and a predicted time series that is a parametric function of the one or more updated hyperparameters, and train the second machine learning model to determine anomalies in the data set, wherein the training is performed using the one or more updated hyperparameters.

14. The system of claim 13, wherein the data set includes at least one of a set of metrics of a second system or a set of logs of the second system.

15. The system of claim 13, wherein the anomaly label is received through a user interface as a selection of the one or more data points of the data set and a selection of the anomaly label.

16. The system of claim 13, wherein the error in the determination comprises an incorrect determination by the second machine learning model that the one or more data points correspond to the anomaly.

17. The system of claim 13, wherein the training includes at least one of retraining of the second machine learning model or training a replacement machine learning model to replace the second machine learning model.

18. The system of claim 13, wherein the processor is further configured, when executing the instructions, to display a predicted anomaly label for the one or more data points received from the second machine learning model after the training.

19. The system of claim 13, wherein the processor is further configured, when executing the instructions, to apply the second machine learning model, after the training, to detect anomalies in the data set.

20. The system of claim 13, wherein the one or more updated hyperparameters includes one or more of, a window size, a sequence length, a number of long short-term memory units, a number of repeat units, a number of training epochs, a training batch size, an optimization function, an activation function, a loss function, or the decay rate.

21. The system of claim 13, wherein the second machine learning model determines anomalies in the data set according to a baseline.

22. The system of claim 13, wherein a baseline for determining anomalies is determined according to a baseline equation.

23. The system of claim 13, wherein the processor is further configured, when executing the instructions, to train the first machine learning model based on a reinforcement learning process.

24. The system of claim 13, wherein the error in the determination comprises a failure by the second machine learning model to determine that the one or more data points correspond to the anomaly.

25. A computer-implemented method, comprising:

receiving, for one or more data points of a data set, an anomaly label indicating an error in a determination by a second machine learning model about whether the one or more data points correspond to an anomaly, generating, using a first machine learning model, one or more updated hyperparameters based on the one or more data points and the anomaly label, wherein the first machine learning model is trained to minimize a cost function that incorporates a previous cost state weighted by a decay rate and a difference between a time-series data sample and a predicted time series that is a parametric function of the one or more updated hyperparameters, and training the second machine learning model to determine anomalies in the data set, wherein the training is performed using the one or more updated hyperparameters.

26. The computer-implemented method of claim 25, wherein the data set includes at least one of a set of metrics of a system or a set of logs of the system.

27. The computer-implemented method of claim 25, wherein the anomaly label is received through a user interface as a selection of the one or more data points of the data set and a selection of the anomaly label.

28. The computer-implemented method of claim 25, wherein the error in the determination comprises an incorrect determination by the second machine learning model that the one or more data points correspond to the anomaly.

29. The computer-implemented method of claim 25, wherein the training includes at least one of retraining of the second machine learning model or training a replacement machine learning model to replace the second machine learning model.

30. The computer-implemented method of claim 25, further comprising: displaying a predicted anomaly label for the one or more data points received from the second machine learning model after the training.

31. The computer-implemented method of claim 25, further comprising: applying the second machine learning model, after the training, to detect anomalies in the data set.

32. The computer-implemented method of claim 25, wherein the one or more updated hyperparameters includes one or more of, a window size, a sequence length, a number of long short-term memory units, a number of repeat units, a number of training epochs, a training batch size, an optimization function, an activation function, a loss function, or the decay rate.

33. The computer-implemented method of claim 25, wherein the second machine learning model determines anomalies in the data set according to a baseline.

34. The computer-implemented method of claim 25, wherein a baseline for determining anomalies is determined according to a baseline equation.

35. The computer-implemented method of claim 25, further comprising: training the first machine learning model based on a reinforcement learning process.

36. The computer-implemented method of claim 25, wherein the error in the determination comprises a failure by the second machine learning model to determine that the one or more data points correspond to the anomaly.

* * * * *